US011895757B2

(12) United States Patent
Choi et al.

(10) Patent No.: US 11,895,757 B2
(45) Date of Patent: Feb. 6, 2024

(54) PERFORMANCE DIRECTING METHOD AND PERFORMANCE DIRECTING SYSTEM USING THE SAME

(71) Applicant: FANLIGHT CO., LTD., Seoul (KR)

(72) Inventors: Kyung Il Choi, Seoul (KR); Jung Min Choi, Seoul (KR); Hyun Gil Kim, Seoul (KR)

(73) Assignee: FANLIGHT CO., LTD., Seoul (KR)

( * ) Notice: Subject to any disclaimer, the term of this patent is extended or adjusted under 35 U.S.C. 154(b) by 58 days.

(21) Appl. No.: 17/736,394

(22) Filed: May 4, 2022

(65) Prior Publication Data

US 2022/0264733 A1 Aug. 18, 2022

Related U.S. Application Data

(63) Continuation of application No. PCT/KR2021/005828, filed on May 10, 2021.

(30) Foreign Application Priority Data

Feb. 4, 2021 (KR) ........................ 10-2021-0016220
Mar. 18, 2021 (KR) ........................ 10-2021-0034977

(51) Int. Cl.
*H05B 47/19* (2020.01)
*H05B 47/155* (2020.01)
*H05B 47/165* (2020.01)

(52) U.S. Cl.
CPC ........... *H05B 47/19* (2020.01); *H05B 47/155* (2020.01); *H05B 47/165* (2020.01)

(58) Field of Classification Search
CPC .... H05B 47/19; H05B 47/155; H05B 47/165; H05B 47/10; A63J 5/02; F21V 23/045;
(Continued)

(56) References Cited

U.S. PATENT DOCUMENTS 7,697,925 B1 4/2010 Wilson et al.
9,877,377 B2 1/2018 Ando
(Continued)

FOREIGN PATENT DOCUMENTS

EP 3726491 A1 10/2020
JP 2017-139201 A 8/2017
(Continued)

OTHER PUBLICATIONS

International Search Report issued in PCT/KR2021/005828; dated Oct. 21, 2021.
An Office Action; "Notice of Reasons for Refusal," mailed by the Japanese Patent Office dated Jun. 13, 2023, which corresponds to Japanese Patent Application No. 2022-529737 and is related to U.S. Appl. No. 17/736,394.
(Continued)

*Primary Examiner* — Daniel D Chang
(74) *Attorney, Agent, or Firm* — Studebaker & Brackett PC

(57) ABSTRACT

Disclosed is a performance directing system including a control console device that generates at least one emission control signal including data, in which an emission-related operation is defined for each direction scene, and transmits the at least one emission control signal to at least one communication device, the at least one communication device that transmits the emission control signal received from the control console device, and at least one light emitting device that identifies an emission control signal, which includes predetermined identification information of a communication device, from among the emission control signal thus transmitted and performs the emission-related operation defined in the data in the identified emission control signal.

15 Claims, 6 Drawing Sheets

(58) Field of Classification Search
CPC ............... H04W 4/30; H04W 72/0453; F21W 2131/406
See application file for complete search history.

(56) References Cited

U.S. PATENT DOCUMENTS

| | | | | |
|---|---|---|---|---|
| 10,880,975 | B2 | 12/2020 | Song | |
| 10,893,597 | B2 | 1/2021 | Choi et al. | |
| 11,096,263 | B2 | 8/2021 | Jo | |
| 2014/0132181 | A1 | 5/2014 | Gerszberg | |
| 2015/0264765 | A1 | 9/2015 | Gerszberg | |
| 2017/0231067 | A1 | 8/2017 | Ando | |
| 2018/0084626 | A1 | 3/2018 | Song | |
| 2018/0235045 | A1 | 8/2018 | Gerszberg | |
| 2019/0394860 | A1* | 12/2019 | Choi | H05B 47/155 |
| 2020/0337143 | A1 | 10/2020 | Jo | |
| 2020/0357315 | A1 | 11/2020 | Saes | |
| 2021/0059034 | A1 | 2/2021 | Song | |
| 2021/0076471 | A1 | 3/2021 | Kwon et al. | |
| 2021/0084737 | A1 | 3/2021 | Choi et al. | |

FOREIGN PATENT DOCUMENTS

| | | | | |
|---|---|---|---|---|
| JP | 2020-004703 | A | 1/2020 | |
| KR | 10-2008-0072229 | A | 8/2008 | |
| KR | 10-2012-0019615 | A | 3/2012 | |
| KR | 10-2015-0055938 | A | 5/2015 | |
| KR | 10-2016-0149580 | A | 12/2016 | |
| KR | 10-1939627 | B1 | 1/2019 | |
| KR | 10-2020-0123735 | A | 10/2020 | |
| KR | 20200123735 | A * | 10/2020 | A63J 5/02 |
| KR | 10-2021-0035104 | A | 3/2021 | |
| KR | 10-2021-0043510 | A | 4/2021 | |
| WO | 2019/093888 | A1 | 5/2019 | |

OTHER PUBLICATIONS

The extended European search report issued by the European Patent Office dated Nov. 14, 2022, which corresponds to European Patent Application No. 21887870.0-1201 and is related to U.S. Appl. No. 17/736,394.

* cited by examiner

FIG. 5

| Division | Content | Role |
|---|---|---|
| 1 | Frame Sequence Number(FSN) | Providing order of transmitted data |
| ⋮ | ⋮ | ⋮ |
| 2 | Reference identification information | Providing reference identification information that is basis for calculations |
| 3 | Operator and operation coefficient | Light emitting device determines whether to emit light through calculation |
| 4 | Performance identification information | Including information about each agency, each performance organizer, each performance date, each performance round, or the like |
| 5 | Transmitter identification information | Providing identification information of transmitter that transmits emission control signal |
| 6 | Emission pattern | Including information about light emitting device control method |
| ⋮ | ⋮ | ⋮ |
| 7 | Vibration value | Vibration value of light emitting device |
| ⋮ | ⋮ | ⋮ |

510

PERFORMANCE DIRECTING METHOD AND PERFORMANCE DIRECTING SYSTEM USING THE SAME

CROSS-REFERENCE TO RELATED APPLICATIONS

The present application is a continuation of International Patent Application No. PCT/KR2021/005828, filed on May 10, 2021, which is based upon and claims the benefit of priority to Korean Patent Application No. 10-2021-0016220 filed on Feb. 4, 2021 and Korean Patent Application No. 10-2021-0034977 filed on Mar. 18, 2021. The disclosures of the above-listed applications are hereby incorporated by reference herein in their entirety.

BACKGROUND

Embodiments of the inventive concept described herein relate to a performance directing method in a performance hall by using a light emitting device and a performance directing system using the same.

In general, a light emitting device (or a lighting device) refers to a light emitting device that achieves the purpose of lighting by reflecting, refracting, and transmitting light from a light source. Light emitting devices may be classified into an indirect light emitting device, a semi-indirect light emitting device, a full-diffusion light emitting device, a semi-direct light emitting device, and a direct light emitting device depending on light distribution.

With developments of technologies, the light emitting device is being used for various purposes. For example, the light emitting device is used to direct a media faηade. The media faηade refers to the implementation of media functions by installing light emitting devices on exterior walls of a building.

As another example, light emitting devices are sometimes used as small cheering tools in a sports stadium or concert hall in an illumination environment of a specific level or less. However, because a plurality of lighting devices is individually controlled in such the environment, it is difficult to create a systematic lighting pattern or shape. Moreover, it is not easy to achieve expected cheering effects by using only light sources positioned in the light emitting device.

In addition, it is difficult to create a systematic lighting pattern or shape through a lot of light emitting devices due to the limitation of an available wireless bandwidth.

Accordingly, to specifically solve the above problems, there is a need for a method capable of collectively controlling a plurality of light emitting devices and directing various performances in a performance hall such as a sports stadium or concert hall through this control.

SUMMARY

Embodiments of the inventive concept provide a performance directing method in a performance hall by using a light emitting device, and a performance directing system using the same.

Embodiments of the inventive concept provide a performance directing method for controlling at least one light emitting device by using at least one transmitter within a limited wireless bandwidth, and a performance directing system using the same.

Problems to be solved by the inventive concept are not limited to the problems mentioned above, and other problems not mentioned will be clearly understood by those skilled in the art from the following description.

According to an embodiment, a performance directing system includes a control console device that generates at least one emission control signal including data, in which an emission-related operation is defined for each direction scene, and transmits the at least one emission control signal to at least one communication device, the at least one communication device that transmits the emission control signal received from the control console device, and at least one light emitting device that identifies an emission control signal, which includes predetermined identification information of a communication device, from among the emission control signal thus transmitted and performs the emission-related operation defined in the data in the identified emission control signal.

Furthermore, the at least one emission control signal may be transmitted through a different wireless bandwidth.

Moreover, the at least one light emitting device may store identification information of the at least one communication device and a wireless bandwidth to be used by the at least one communication device in a list.

Besides, when an identification information correction command signal including identification information of a specific communication device is received, the at least one light emitting device may replace the predetermined identification information of the communication device with the identification information of the specific communication device to identify an emission control signal of the specific communication device.

Also, when receiving a general-purpose emission control signal, the at least one light emitting device may perform an emission-related operation defined in data in all emission control signals thus received, regardless of the identification information of the communication device thus stored in advance.

Furthermore, the data may further include identification information of the light emitting device. Only when the identification information of the light emitting device included in the data is identical to identification information of a light emitting device thus stored in advance, the at least one light emitting device may perform the emission-related operation defined in the data in the emission control signal.

Moreover, the data may further include an operator and an operation coefficient. The at least one light emitting device may calculate identification information of a light emitting device, which will perform the emission-related operation, based on the operator and the operation coefficient, and may perform the emission-related operation defined in the data in the emission control signal when the calculation result indicates that the pre-stored identification information of the light emitting device is included in the identification information of the light emitting device, which will perform the emission-related operation.

Besides, the data may further include performance identification information. The performance identification information may include at least one of an agency, a performance organizer, a performance date, and a performance round.

According to an embodiment, a performance directing method in a performance hall by using a light emitting device includes generating, by a control console device, at least one emission control signal including data, in which an emission-related operation is defined for each direction scene, and transmitting the at least one emission control signal to at least one communication device, transmitting, by the at least one communication device, the emission control signal received from the control console device, and identifying, by at least one light emitting device, an emission control signal, which includes predetermined identification information of a communication device, from among the emission control signal thus transmitted and performing the emission-related operation defined in the data in the identified emission control signal.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 5 is an example illustrating an emission control signal, according to an embodiment of the inventive concept.

DETAILED DESCRIPTION

Figure 1:
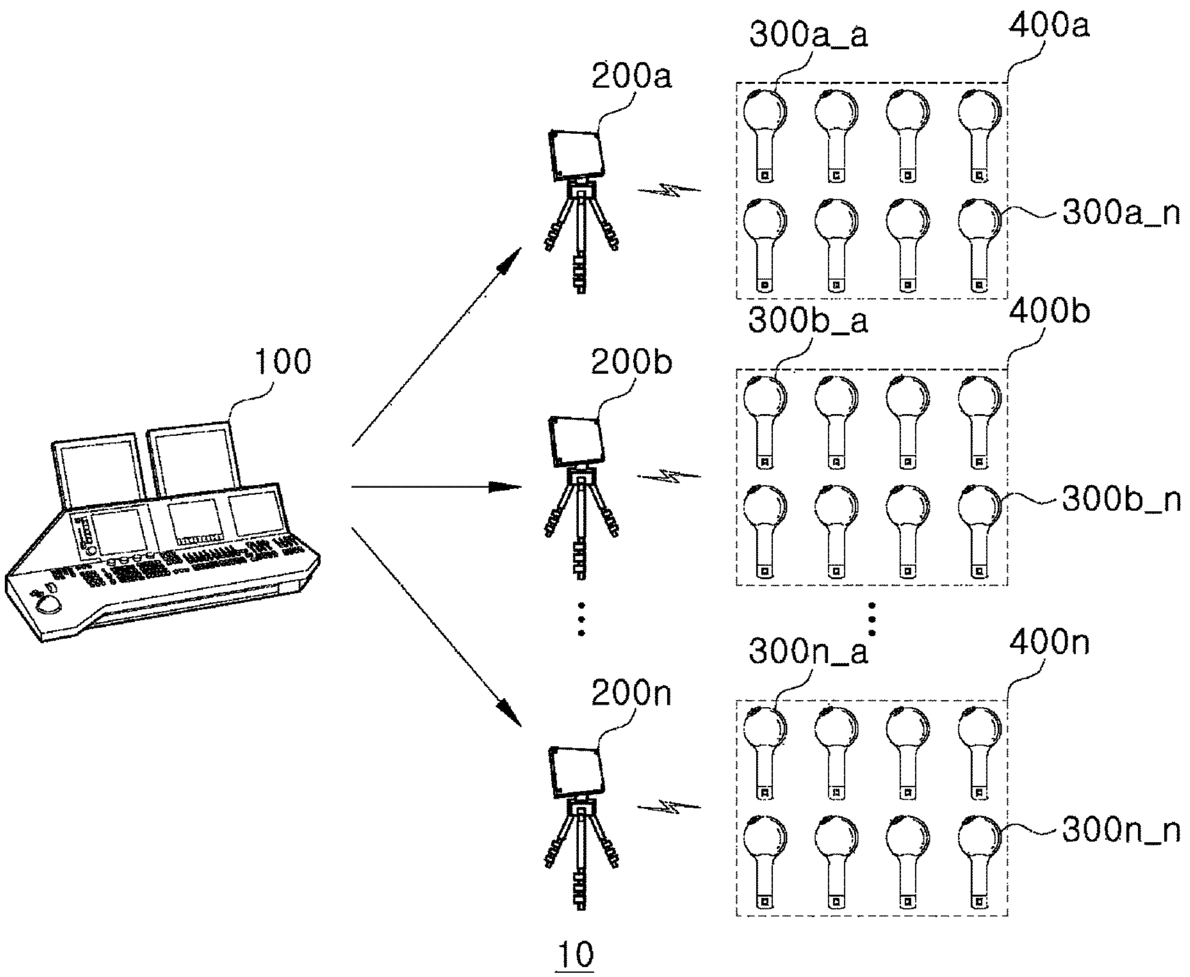
FIG. 1 is a diagram schematically illustrating a configuration of a performance directing system for a performance direction in a performance hall, according to an embodiment of the inventive concept.

The above and other aspects, features and advantages of the inventive concept will become apparent from the following description of the following embodiments given in conjunction with the accompanying drawings. The inventive concept, however, may be embodied in various different forms, and should not be construed as being limited only to the illustrated embodiments. Rather, these embodiments are provided as examples so that the inventive concept will be thorough and complete, and will fully convey the scope of the inventive concept to those skilled in the art. The inventive concept may be defined by the scope of the claims.

The terms used herein are provided to describe embodiments, not intended to limit the inventive concept. In the specification, the singular forms include plural forms unless particularly mentioned. The terms "comprises" and/or "comprising" used herein do not exclude the presence or addition of one or more other components, in addition to the aforementioned components. The same reference numerals denote the same components throughout the specification. As used herein, the term "and/or" includes each of the associated components and all combinations of one or more of the associated components. It will be understood that, although the terms "first", "second", etc., may be used herein to describe various components, these components should not be limited by these terms. These terms are only used to distinguish one component from another component. Thus, a first component that is discussed below could be termed a second component without departing from the technical idea of the inventive concept.

A word "exemplary" is used herein in the sense of "being used as an example or illustration". An embodiment described herein as "exemplary" is not necessarily to be construed as preferred or advantageous over other embodiments.

The term "unit" used herein may refer to software or hardware such as field programmable gate array (FPGA) or application specific integrated circuit (ASIC), and the "unit" may perform some functions. However, the "unit" may be not limited to software or hardware. The "unit" may be configured to exist in an addressable storage medium or may be configured to reproduce one or more processors. Therefore, as an example, "units" may include various elements such as software elements, object-oriented software elements, class elements, and task elements, processes, functions, attributes, procedures, subroutines, program code segments, drivers, firmware, microcodes, circuits, data, databases, data structures, tables, arrays, and variables. Functions provided in "units" and elements may be combined into a smaller number of "units" and elements or may be divided into additional "units" and elements.

Moreover, in this specification, all "units" may be controlled by at least one processor, and at least one processor may perform operations performed by the "units" of the inventive concept.

Embodiments of the present specification may be described in terms of a function or a block performing a function. A block capable of being referred to as a 'unit' or a 'module' of the inventive concept is physically implemented by analog or digital circuits such as logic gates, integrated circuits, microprocessors, microcontrollers, memories, passive electronic components, active electronic components, optical components, hardwired circuits, and the like and may be selectively driven by firmware and software.

Embodiments of the present specification may be implemented by using at least one software program running on at least one hardware device and may perform a network management function of controlling an element.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

As illustrated in the figures, spatially relative terms, such as "below", "beneath", "lower", "above", "upper", and the like, may be used herein for ease of description to describe the relationship between one component and other components. It will be understood that the spatially relative terms are intended to encompass different orientations of the components in use or operation in addition to the orientation depicted in the figures. For example, when inverting a component shown in the figures, a component described as "below" or "beneath" of another component may be placed "above" another element. Thus, the exemplary term "below" may include both downward and upward directions. The components may also be oriented in different directions, and thus the spatially relative terms may be interpreted depending on orientation.

Hereinafter, embodiments of the inventive concept will be described in detail with reference to accompanying drawings.

FIG. 1 is a diagram schematically illustrating a configuration of a performance directing system for a performance direction in a performance hall, according to an embodiment of the inventive concept.

Referring to FIG. 1, according to an embodiment of the inventive concept, a system 10 (hereinafter referred to as a "performance directing system") for directing a performance in a performance hall may include a control console device 100, a transmitter (200*a*, 200*b*, . . . , 200*n*, hereinafter referred to as "200") and a light emitting device (300*a_a*, . . . , 300*a_n*, 300*b_a*, . . . , 300*b_n*, 300*n_a*, . . . , 300*n_n*, hereinafter referred to as "300"). The performance directing system 10 may direct various types of light emission patterns for performance direction such as cheering in audience seats in the performance hall as the control console device 100 controls a light emitting state of the light emitting device 300.

The control console device 100 may perform a function of controlling the light emitting device 300 for performance direction in the performance hall. In an embodiment, the control console device 100 may be one of electronic devices such as a mobile phone, a smart phone, a laptop computer, a digital broadcasting terminal, a personal digital assistant (PDA), a portable multimedia player (PMP), a navigation system, a slate PC, a tablet PC, an ultrabook, and a wearable device, for example, a watch-type terminal (e.g., a smart watch), a glass-type terminal (e.g., a smart glass), a head mounted display (HMD), or the like. The control console device 100 may include all electronic devices capable of installing and executing an application related to an embodiment or may include some of configurations of the electronic device or may be implemented in various forms capable of interworking therewith.

Furthermore, the control console device 100 may be one of software for PC and an electronic device such as MA Lighting grandMA2, grandMA3, ETC EOS, ETC ION, ETC GIO, Chroma Q Vista, High End HOG, High End Fullboar, Avolites Sapphire Avolites Tiger, Chamsys MagicQ, Obsidian control systems Onyx, Martin M6, Martin M1, Nicolaudie Sunlite, ESA, ESA2, Lumidesk, SunSuite, Arcolis, Daslight, LightRider, MADRIX, DJ LIGHT STUDIO, DISCO-DESIGNER VJ STUDIO, Stagecraft, Lightkey, or the like.

In an embodiment of the inventive concept, the transmitter 200 may be a communication device such as an antenna, and may transmit an emission control signal received from the control console device 100 to the light emitting device 300. When the transmitter 200 may receive the emission control signal for controlling emission of the light emitting device 300 from the control console device 100 and may transmit the emission control signal to the light emitting device 300, the light emitting device 300 may emit light to correspond to an emission pattern included in the emission control signal.

In an embodiment of the inventive concept, it is disclosed that the transmitter 200 is a separate device from the control console device 100. However, the control console device 100 may include a communication module performing the same role as the transmitter 200. Accordingly, the control console device 100 may perform the same role as the transmitter 200 according to embodiments. The light emitting device 300 may receive the emission control signal from the control console device 100 and then may emit light.

In an embodiment of the inventive concept, the control console device 100 includes appropriate software or a computer program for controlling the light emitting device 300. In an embodiment, an exemplary protocol for controlling the light emitting device 300 may include DMX512, RDM, Art-Net, sACN, ETC-Net2, Pathport, Shownet, or KiNET. The control console device 100 transmits a data signal (e.g., an emission control signal) in an appropriate format such as DMX512, Art-Net, sACN, ETC-Net2, Pathport, Shownet or KiNET. The control console device 100 generates the emission control signal to control the light emitting device 300. The emission control signal is transmitted to the light emitting device 300 such that one or more light emitting devices emit light depending on the emission control signal. The emission control signal may include information about an emission state (e.g., an emission color, a brightness value, a blinking speed, or the like).

Besides, the emission control signal generated from the control console device 100 may be received by a master device (not shown). The master device may convert the emission control signal into a wireless signal. Also, the master device may deliver the converted wireless signal to the transmitter 200. The transmitter 200 may transmit the converted wireless signal to the light emitting device 300 in the performance hall by using wireless communication (e.g., RF communication, or the like). Here, the wireless signal may be generated by converting control data into a signal in a format for controlling the light emitting device 300 in a wireless communication method.

According to an embodiment, a master device may be omitted. That is, the control console device 100 may directly transmit an emission control signal to the transmitter 200, and then the transmitter 200 may convert the emission control signal into a wireless signal and may transmit the wireless signal to the light emitting device 300.

Moreover, the control console device 100 may include a plurality of input/output ports. The control console device 100 may have an input/output port corresponding to or related to a specific data signal format or protocol. For example, the control console device 100 may have a first port dedicated to RDM and DMX512 data input/output and a second port dedicated to Art-Net and sACN, ETC-Net2, Pathport, Shownet, KiNET data input/output.

The DMX512, RDM, Art-Net, sACN, ETC-Net2, Pathport, Shownet and KiNET protocols are widely known as control protocols for stage lighting installations. According to embodiments of the inventive concept, flexible control planning for the light emitting device 300 is possible by using control protocols such as DMX512, RDM, Art-Net, sACN, ETC-Net2, Pathport, Shownet, and KiNET.

In an embodiment of the inventive concept, under the control of the control console device 100, the light emitting device 300 may perform a function of directing various types of performance directing effects in real time or depending on predetermined control information.

In addition, the light emitting device 300 may be a device including any electronic device that includes a light emitting element/device such as an LCD or LED or is connected to a light emitting element/device and is capable of wireless communication. The light emitting device 300 may be a small cheering tool carried by audiences in a performance hall such as an athletic stadium or a concert. As an embodiment, the light emitting device 300 may correspond to a mobile phone, a wireless light stick, a lighting stick, a lighting bar, a lighting ball, a lighting panel, and a device attached with a light source that is wirelessly controllable. In this specification, the light emitting device 300 may be referred to as a lighting device, a receiver, a controlled device, a slave, or a slave lighting device. Also, the light emitting device 300 may include a wearable device capable of being attached to and/or worn on a part of the body such as a wrist or chest.

In an embodiment of the inventive concept, on the basis of identification information of the transmitter 200 thus previously stored, the light emitting device 300 may interpret the emission control signal received from the transmitter 200 and may emit light. In detail, the light emitting device 300 may compare the pre-stored identification information of the transmitter 200 with identification information of a transmitter included in the emission control signal. When the pre-stored identification information of the transmitter 200 is the same as identification information of a transmitter included in the emission control signal, the light emitting device 300 may emit light to correspond to an emission pattern included in the corresponding emission control signal.

As shown in FIG. 1, the light emitting devices (300*a_a*, . . . , 300*a_n*) included in a set 400*a* may emit light to correspond to an emission pattern included in the emission control signal received from a transmitter 200*a*; the light emitting devices (300*b_a*, . . . , 300*b_n*) included in a set 400*b* may emit light to correspond to an emission pattern included in the emission control signal received from a transmitter 200*b*; and, the light emitting devices (300*n_a*, . . . , 300*n_n*) included in a set 400*n* may emit light to correspond to an emission pattern included in the emission control signal received from a transmitter 200*n*. Here, the sets (400*a*, 400*b*, . . . , 400*n*, hereinafter referred to as "400") may refer to a set of light emitting devices having the same transmitter identification information. Accordingly, the number of light emitting devices included in each set may be different for each set. Assuming that the light emitting device 300 is positioned in a seat, the set 400 may be divided for each zone and region based on seat information of the performance hall, depending on the performance planner's intent. Accordingly, the set 400 may correspond to information indicating zone A, zone B, or the like, which is the greatest unit of seat information marked on each seat. In addition, the performance planner may divide a control area into sets within one zone and may control light emitting devices included in different sets by using different transmitters.

The transmitter 200 according to an embodiment of the inventive concept may have directivity. In a performance planning stage, the performance planner may place the transmitter 200 in consideration of the specification of a transmitter used in the corresponding performance. Accordingly, the light emitting device 300 may receive an emission control signal from the transmitter 200 having identification information corresponding to pre-stored identification information of a transmitter.

Also, in an embodiment of the inventive concept, the identification information of a transmitter may include not only ID of the transmitter, but also a series of information (e.g., characters, keywords, and sentences) associated with a specific transmitter that transmits data to be received by a specific light emitting device.

In an embodiment, when the light emitting device 300 is controlled in a group control method, each of the transmitters 200 may transmit range information of control groups, each of which is responsible for at least one direction scene, as identification information. In this case, the light emitting device 300 may identify group information corresponding to the received scene, may determine whether the group information is included within a range of groups transmitted as identification information, and thus may determine whether to emit light depending on a control signal included in data received from the corresponding transmitter. For example, the first transmitter may transmit information indicating that first to 100th groups are controlled at a first scene, as identification information. The second transmitter may transmit information indicating that 101st to 300th groups are controlled at the first scene, as identification information. When a specific light emitting device that has received the identification information from the first transmitter and the second transmitter is included in the 105th group at the first scene during group control, the specific light emitting device may determine to emit light depending on a control signal included in data received from the second transmitter. Accordingly, even when the identification information of a transmitter is not stored in a memory 320 in advance, the light emitting device 300 may determine a transmitter for transmitting data including a control signal for controlling light emission, by calculating the transmitted identification information of the transmitter in real time.

Similarly to group control, when the light emitting device 300 is controlled in a pixel control method, each of the transmitters 200 may transmit range information of pixels, each of which is responsible for at least one direction scene, as identification information. In this case, the light emitting device 300 may identify pixel information corresponding to the received scene, may determine whether the pixel information is included within the range of sets transmitted as identification information, and thus may determine whether to emit light depending on a control signal included in data received from the corresponding transmitter.

Hereinafter, for convenience of description in the present specification, it is assumed that identification information of a transmitter such as ID is stored in the memory 310.

Figure 2:
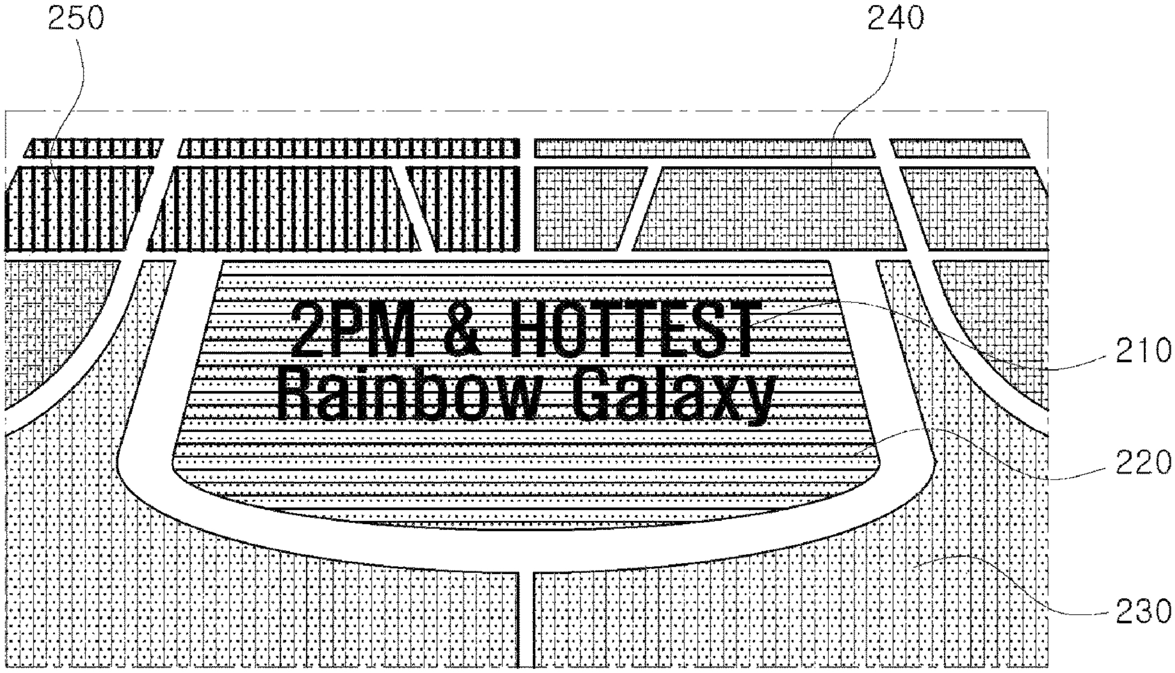
FIG. 2 is a diagram illustrating an example of performance directing effects directed on audience seats in a performance hall, according to an embodiment of the inventive concept.

FIG. 2 is a diagram illustrating an example of performance directing effects directed on audience seats in a performance hall, according to an embodiment of the inventive concept.

To implement performance directing effects by using the light emitting device 300 positioned to correspond to each seat in a performance hall, the performance directing system 10 may generate an emission control signal.

At this time, the emission control signal may be generated by the control console device 100 or may be generated by a separate device (e.g., a data generation device or an external server) and provided to the control console device 100. For convenience of description, it will be described below that the control console device 100 generates the emission control signal.

At this time, the control console device 100 may receive and store performance direction data from another device (e.g., the data generation device) in advance or may receive the performance direction data through other storage or transmission media. Furthermore, the control console device 100 may receive the performance direction data in real time during a performance and may generate the emission control signal corresponding to the performance direction data.

The performance direction data may include control information for each scene directed during a performance time. That is, the performance direction data may include information about group control, picture control, and pixel control, which will be described below for each scene.

A data generation device (not illustrated) may generate a direction scene to be directed by using the light emitting device 300 during a performance time in a performance hall. At this time, the data generation device may organize the direction scene for each performance direction section depending on the direction scene. For example, a first direction scene (e.g., a first scene) may be generated in a first performance direction section (e.g., a first time). A second direction scene (e.g., a second scene) may be generated in a second performance direction section (e.g., a second time). As illustrated in FIG. 2, when audience seats in the performance hall are organized, the first direction scene displayed with a different emission color for each audience seat may be generated in the first performance direction section together with a specific text as illustrated in FIG. 2. Moreover, a second direction scene, which is different from the first direction scene, such as a specific figure or pattern may be generated in the second performance direction section.

According to an embodiment of the inventive concept, when the light emitting device 300 is controlled for each group, the data generation device may group audience seats in the performance hall into a plurality of groups based on each direction scene generated for each performance direction section and then may generate group information about the plurality of groups. For example, when there are a plurality of group units capable of being grouped in a similar or identical light emission shape in the first direction scene to be directed in the first performance direction section, the data generation device may divide audience seats in the performance hall into a plurality of areas to correspond to a group unit and may generate the divided areas as each group. In other words, the first direction scene of the first performance direction section may include the plurality of groups.

Referring to FIG. 2, the data generation device may designate audience seats marked with a specific text to a first group 210, may identify seats to be directed in the same emission color within the audience seats, and may designate the seats to second to fifth groups 220, 230, 240, and 250.

The group control may be a control method for controlling all light emitting devices emitting light with the same emission color in one group. However, the group control method described in FIG. 2 is only an example for controlling the light emitting device 300. The emission control signal does not need to be limited to only a signal for group control. For example, the emission control signal according to an embodiment of the inventive concept may include a control signal for controlling the light emitting device 300 for each picture or for each pixel.

On the basis of an emission color that each of the light emitting device 300 stores in advance for each performance direction scene, the picture control may be a control method for emitting light for each scene when the emission control signal is received. For example, to emit red light at the first direction scene and to emit green light at the second direction scene, a specific light emitting device may store values of red, green, blue, white, amber, or the like corresponding to a emission and control device in advance for each scene.

Accordingly, in group control, the light emitting device 300 stores information about a group, to which the light emitting device 300 belongs, for each scene. On the other hand, in picture control, the light emitting device 300 stores an emission color for each scene.

Furthermore, similarly to the group control, in pixel control, the light emitting device 300 may store information associated with a pixel to which the light emitting device 300 belongs. Here, a pixel may include at least one continuous seat. Accordingly, in group control, the light emitting device 300 positioned in a seat that is not continuous may be controlled with the same color. On the other hand, in pixel control, the light emitting device 300 positioned in a seat thus continuous may be controlled with the same color.

Returning to FIG. 2, the control console device 100 may transmit an emission control signal based on at least one of group control, pixel control, and picture control. The light emitting device 300 may receive the emission control signal and may emit light such that a text is displayed in a performance hall, as illustrated in FIG. 2, or various directing effects are realized. The above-described operation of the data generation device may be performed by the control console device 100.

Figure 3:
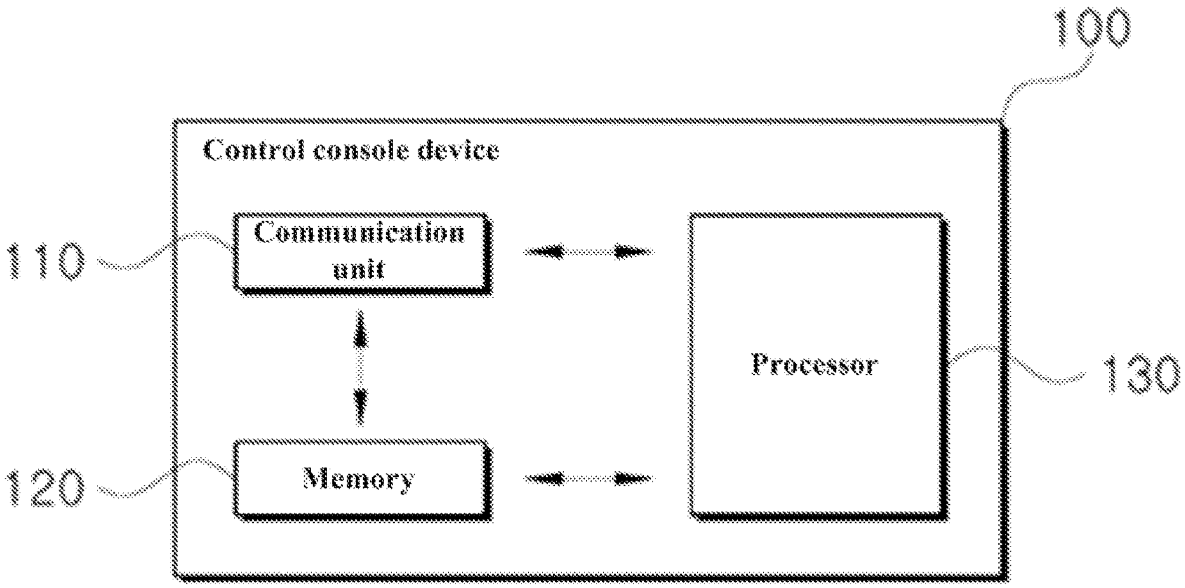
FIG. 3 is a block diagram illustrating a configuration of a control console device, according to an embodiment of the inventive concept.

FIG. 3 is a block diagram illustrating a configuration of a control console device, according to an embodiment of the inventive concept.

According to an embodiment of the inventive concept, the control console device 100 may include a communication unit 110, a memory 120, and a processor 130. The components shown in FIG. 3 are not essential in implementing the control console device 100. The control console device 100 described herein may have more or fewer components than those listed above.

The communication unit 110 among the components may include one or more modules that enable wired or wireless communication with the transmitter 200, a wireless communication terminal (e.g., a smartphone) (not shown) carried by an audience, or a data generation device (not shown). Furthermore, the communication unit 110 may include one or more modules connecting the control console device 100 to one or more networks.

The memory 120 may include a cache, a buffer, or the like. The memory 120 may store data received or generated from the processor 130 or the data generation device. In an embodiment, the memory 120 may store performance direction data generated by the data generation device.

On the basis of the performance direction data stored in the memory 120, the processor 130 may generate an emission control signal corresponding to a direction scene of each scene in the corresponding performance direction section and may transmit the generated control signal to the transmitter 200.

Hereinafter, a process of controlling the light emitting device 300 through the performance directing system 10 in a performance hall and a configuration of the light emitting device 300 will be described with reference to FIGS. 4 to 6.

Figure 4:
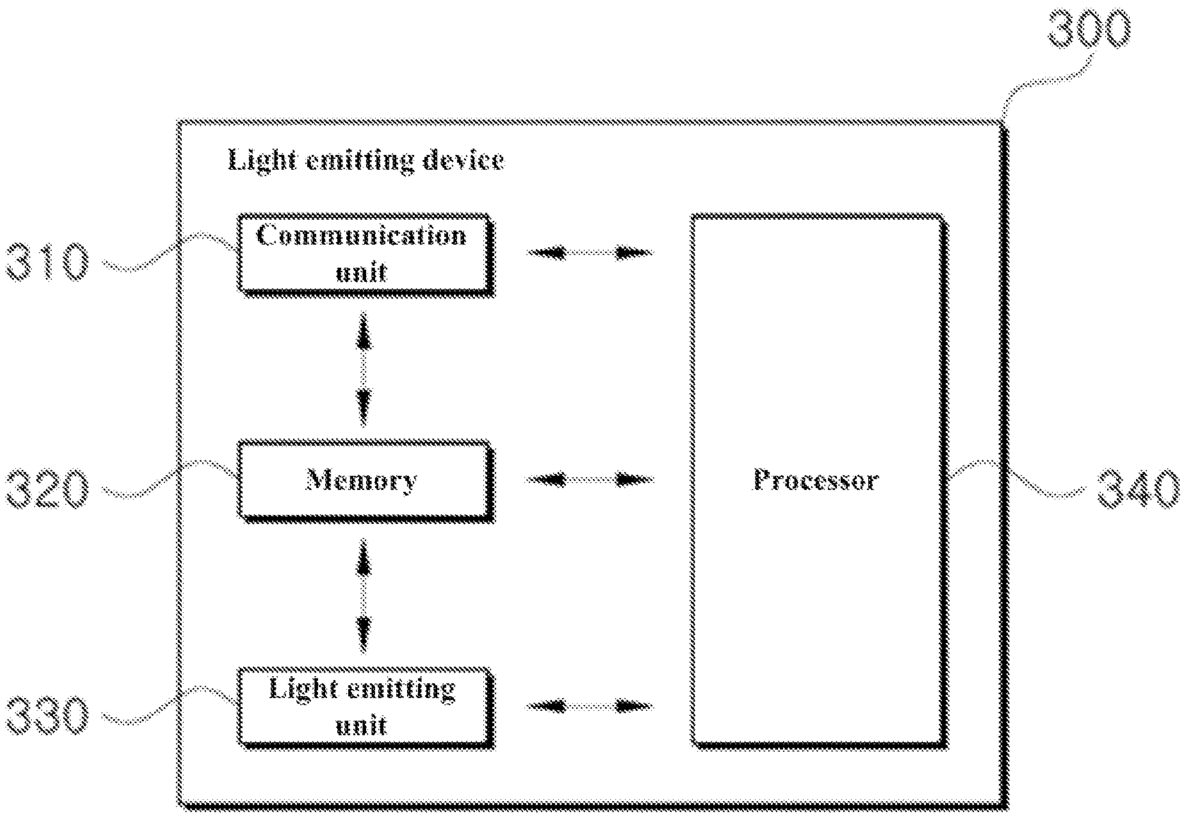
FIG. 4 is a block diagram illustrating a configuration of a light emitting device, according to an embodiment of the inventive concept.

FIG. 4 is a block diagram illustrating a configuration of a light emitting device, according to an embodiment of the inventive concept.

According to an embodiment of the inventive concept, the light emitting device 300 may include a communication unit 310, a memory 320, a light emitting unit 330, and a processor 340. The components shown in FIG. 4 are not essential in implementing the light emitting device 300. The light emitting device 300 described herein may have more or fewer components than those listed above.

In more detail, the communication unit 310 among the components may include one or more modules that enable wired or wireless communication with the control console device 100, the transmitter 200, or a wireless communication terminal (e.g., a smartphone) (not shown) carried by an audience. Furthermore, the communication unit 310 may include one or more modules connecting the light emitting device 300 to one or more networks.

The communication unit 310 may communicate with various types of external devices depending on various types of communication methods. The communication unit 310 may include at least one of a Wi-Fi chip, a Bluetooth chip, a wireless communication chip, an NFC chip, and an RFID.

According to the mobile communication technology of the present specification, a wireless signal is transmitted and received with at least one of a base station, an external terminal, and an external server on a mobile communication network established depending on technical standards or communication methods (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), and the like).

Moreover, the wireless technologies of the present specification includes, for example, wireless LAN (WLAN), Wireless-Fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), and the like.

In addition, the communication technology of the present specification may include a communication support technology by using at least one of Bluetooth, radio frequency identification (RFID), infrared data association (IrDA), ultra wideband (UWB), ZigBee, near field communication (NFC), Wi-Fi, Wi-Fi Direct, wireless universal serial bus (USB), transistor-transistor logic (TTL), USB, IEEE1394, Ethernet, musical instrument digital interface (MIDI), RS232, RS422, RS485, optical Communication, or coaxial cable communication.

Moreover, a data generation device (not shown), the control console device 100, a master (not shown), and the transmitter 200 of the inventive concept may transmit and receive data with each other through wired communication (e.g., Ethernet).

According to an embodiment of the inventive concept, the memory 320 is a local storage medium supporting various functions of the light emitting device 300. The memory 320 may store a plurality of application programs (or applications) running in the light emitting device 300, data for an operation of the light emitting device 300, and instructions. At least part of the application programs may be downloaded from an external device (e.g., an external server) through wireless communication. The application program may be stored in the memory 220, may be installed in the light emitting device 300, and may be driven by the processor 340 to perform an operation (or function) of the light emitting device 300.

Moreover, even when the power supply to the light emitting device 300 is cut off, data needs to be stored. Accordingly, the memory 320 according to an embodiment of the inventive concept may be provided as a writable non-volatile memory (writable ROM) to reflect changes. That is, the memory 320 may be provided as one of a flash memory, an EPROM, or an EEPROM. For convenience of description in an embodiment of the inventive concept, it is described that all instruction information is stored in the single memory 320. However, an embodiment is not limited thereto. For example, the light emitting device 300 may include a plurality of memories.

Besides, the light emitting device 300 according to an embodiment of the inventive concept may receive control-related information through the communication unit 310 and may store the control-related information in the memory 320 such that the light emitting device 300 is controlled depending on at least one of group control, picture control and pixel control.

In an embodiment of the inventive concept, the control-related information may include information that needs to be necessarily stored in the memory 320 such that the light emitting device 300 is controlled depending on at least one of group control, picture control and pixel control. For example, the memory 320 may store scene-specific group information for group control, scene-specific pixel information for pixel control, scene-specific emission information, and identification information of a transmitter.

In addition, the memory 320 may store seat information of a ticket held by an audience. As large crowds gather in a performance hall, a specific light emitting device may fail to correctly store the control-related information for emitting light to correspond to an emission pattern. In this case, there is a need to do individual control on the control console device 100 until the specific light emitting device receives the correct control-related information. The control console device 100 may transmit a control signal for controlling only a specific light emitting device through the transmitter 200.

In addition, seat information of a ticket stored by the memory 320 may include at least one of seat information displayed on the ticket (e.g., seat 1 in row A), location information (e.g., information of the corresponding seat) of the corresponding seat among seats in a performance hall, and identification information (e.g., the top left seat among 50,000 seats is 'No. 1' when performance direction data is generated) of the corresponding seat.

The control-related information is entered into the light emitting device 300 in a production stage of the light emitting device 300 or may be entered through an application installed in a terminal (e.g., a smartphone or a tablet PC) of an audience who possesses the light emitting device 300 before or after the entrance to the performance hall.

The audience may electrically connect a light emitting device to a terminal possessed by the audience, and may download control-related information for performance direction from an external server through an application installed in the terminal and store the control-related information in the memory 320. The electrical connection may be made through short-range wireless communication or a physical connection between the terminal and the light emitting device 300.

Besides, according to an embodiment, the control-related information may be entered in a step of checking a ticket before admission. In detail, the audience may perform the performance ticket checking step before entering the performance hall. In this case, the performance staff may directly enter seat information included in a ticket into the light emitting device 300 by hand or may receive the seat information included in the ticket by using an OCR function or an electronic code reader function through an information check device (not shown). The performance staff may provide the light emitting device 300 with control-related information associated with location information corresponding to the seat information and may store the control-related information in the memory 320. In this case, the location information may be location information for each seat in the performance hall. Moreover, the information check device may provide the light emitting device 300 with the control-related information associated with location information through real-time communication with an external server (not shown) in the performance hall or may store the control-related information associated with location information in advance and may provide the control-related information to the light emitting device 300 in the performance hall at a step of planning a performance.

Also, the information check device may include an electronic device such as a kiosk (not shown). In this case, the audience may directly perform the performance ticket check step through the kiosk. The kiosk may receive electronic code information (in other words, information read through a barcode, a QR code, a RFID, a NFC, or the like) included in the ticket, may provide the light emitting device 300 with the control-related information associated with location information corresponding to the electronic code information, and may store the control-related information in the memory 320. In this case, the kiosk may store the control-related information associated with location information in advance, through communication with an external server (not shown) or at a step of planning a performance.

Here, the aforementioned control-related information may be information included in the performance direction data.

The light emitting unit 330 may include one or more light source elements. The light source element may be, for example, a light emitting diode (LED), or the like. Also, the light emitting unit 330 may output light of various colors according to RGB color information by using a light source element.

Hereinafter, operations of the control console device 100 and the processor 340 for performance direction will be described.

According to an embodiment of the inventive concept, the control console device 100 may generate and transmit at least one emission control signal including data in which an emission-related operation is defined for each direction scene.

As the performance is demonstrated in the performance hall, the control console device 100 may generate emission control signal corresponding to a performance time based on the performance direction data set to implement each direction scene for each performance direction section.

When controlling the light emitting device 300 through group control, the control console device 100 may generate the emission control signal for group control.

The data generation device may map pieces of group information generated for each performance direction section (a performance direction scene) onto information about audience seats and then may generate the mapped information as performance direction data for each performance direction section. For example, as shown in Table 1 below, the data generation device may organize performance direction data obtained by mapping the pieces of group information corresponding to the directing information for each section. Here, the group information means group-specific control information for controlling the light emitting device 300 for each group to correspond to each direction scene for each performance direction section. The group-specific control information may include group allocation information (i.e., group identification information) and emission state information set to correspond to the group allocation information. That is, the light emitting device 300 having the same group allocation information for each performance direction section may include the same emission state information. Moreover, the light emitting device 300 having the same group allocation information may be different for each performance direction section. For example, in the first performance direction section (a first performance direction scene), a light emitting device having 'A' group allocation information may be set to 'B' group allocation information in the second performance direction section (a second performance direction scene). In other words, a light emitting device belonging to group A in the first performance direction section (the first performance direction scene) may be different from a light emitting device belonging to group A in the second performance direction section (the second performance direction scene).

TABLE 1

| | | Direction information (e.g., scene information) | | | | |
|---|---|---|---|---|---|---|
| | | First direction information | | Second direction information | | . . . |
| Group information | Group-specific emission state information | A | (255, 255, 0) | A | (0, 0, 0) | |
| | | B | (154, 112, 55) | B | (255, 0, 0) | |
| | | C | (0, 0, 255) | C | (0, 0, 255) | |
| | | D | (0, 255, 255) | | | |
| | | E | (100, 100, 100) | | | |

As described above, the control console device 100 may control the light emitting device 300 positioned to correspond to each seat in the performance hall by using the performance direction data and may generate emission control signal for such the control. In an embodiment, the light emitting device 300 may store only group information about which group the light emitting device 300 belongs to for each scene in advance before performance direction. In this case, the emission state information (e.g., color information using RGB or the like) may be excluded from the pre-stored information. The group information may refer to a group of light emitting devices 300 controlled with the same color at a specific moment or scene. That is, the group information may be allocated such that the plurality of light emitting devices 300, which are controlled with the same color at a particular scene, have the same group information. Information about color in which the corresponding group is controlled may be excluded.

To this end, the light emitting device 300 may maintain the allocated group-specific emission state information (e.g., color information) as empty data, or may store only dummy data or temporary color information. That is, the actual group-specific color information may be transmitted in real time while the actual performance is demonstrated.

According to an embodiment of the inventive concept, at the ticket check step, the light emitting device 300 may receive control-related information for group control through the information check device or a program (an application program or an application) installed in a terminal possessed by the audience.

In an embodiment, the light emitting device 300 receiving control-related information may receive group information mapped onto the audience seat location information for each performance direction section through the communication unit 310 and then may generate group data as shown in Table 2 below.

TABLE 2

| | Direction information (e.g., scene information) | | | | | |
|---|---|---|---|---|---|---|
| | 1 | 2 | 3 | 4 | 5 | . . . |
| Group information | A | C | F | G | {15, 15} | . . . |

Table 2 shows data of direction scene-specific group information about the one light emitting device 300. The light emitting device 300 may belong to group A in a first scene, and thus may be controlled in the same manner as another cheering lighting device belonging to group A.

Furthermore, when a scene is switched to a second scene, the cheering lighting device 400 may be controlled in the same manner as another cheering lighting device belonging to group C.

In some other embodiments, in the group allocation information stored in advance in the light emitting device 300 may be defined as a specific coordinate range of entire audiences by introducing and applying a virtual coordinate system to the entire seats in the performance hall. One audience seat may have a specific x-y coordinate value, and a plurality of seats adjacent to each other may have the same x-y coordinate value. Moreover, in addition to an x-y coordinate system thus generally used, a location of an audience seat may be specified by introducing a coordinate system.

As such, when some or all of group allocation information stored in advance in each light emitting device is recorded as coordinate information, the performance direction mapping data transmitted in real time from a performance site may include a control signal that allows a light emitting device belonging to a range of a corresponding coordinate value to emit light in a specific color based on one or more specific coordinate values or specific coordinate ranges for the purpose of specifying a light emitting device that emits light with a specific color. That is, when performance direction mapping data is generated by mapping group allocation information onto group emission color information, a coordinate value or a coordinate range may be provided instead of group allocation information. In this case, while a performance is demonstrated, the light emitting device may receive performance direction mapping data, may determine whether the light emitting device is included in specific group allocation information, based on a coordinate value to which the light emitting device belongs, and may emit light with a suitable color based on the determined result. When group information according to the coordinate system set for the entire audience in the performance hall is stored in the light emitting device in advance, an improvised audience seat lighting direction scene may be possible with only a small amount of data transfer. In other words, for the purpose of emitting light by using only a cheering stick in a predetermined color within a specific coordinate range, variable audience seat lighting direction may be possible by generating or modifying performance direction mapping data and transmitting (broadcasting) the performance direction mapping data.

For example, in the case where the entire audience seat of the performance hall is defined in a x-y coordinate system, and predetermined x-y coordinates are allocated in advance to each light emitting device within a specific performance direction section, when the performance direction mapping data set to emit light in red (255, 0, 0) within the specific coordinate range (e.g., from {10, 10} to {20, 15}) is transmitted, when the corresponding performance direction section is implemented in a step of directing a real-time performance, a plurality of light emitting devices that have received the performance direction mapping data may determine whether each of the plurality of light emitting devices belongs to a range from {10, 10} to {20, 15}, based on the coordinate information given to the plurality of light emitting devices. When each of the plurality of light emitting devices belongs to a range from {10, 10} to {20, 15}, the corresponding light emitting device may emit red light.

According to an embodiment of the inventive concept, when the light emitting device 300 is controlled through pixel control, the emission control signal for pixel control may be generated.

The data generation device may map pieces of pixel information generated for each performance direction section (a performance direction scene) onto information about audience seats and then may generate the mapped information as performance direction data for each performance direction section. Furthermore, the data generation device may map a pixel onto color palette information for specifying an emission color (RGB value) of a pixel for each scene and may generate the mapped information as performance direction data for each performance direction section.

The light emitting device 300 may store pixel information about which pixel the light emitting device 300 belongs to for each scene in advance before performance direction. Afterward, when an emission control signal is received, the light emitting device 300 may identify the pixel, to which the light emitting device 300 belongs, and may emit light based on the color palette information corresponding to a pixel included in the emission control signal.

The control console device 100 may generate at least one emission control signal including data, in which an emission-related operation is defined for each direction scene, based on the above-described method of controlling the light emitting device 300 and may transmit the at least one emission control signal to the transmitter 200. In this case, the transmitter 200 needs to transmit emission control signals that are different from or the same as each other.

In detail, the control console device 100 may transmit emission control signals, which are different from or the same as each other, to the transmitter 200 depending on a control method (group control, pixel control, and picture control) and a direction scene for each of the sets 400. For example, when the set 400*a* is controlled through a group control method, the set 400*b* is controlled through a picture control method, and the set 400*n* is controlled through a pixel control method, the control console device 100 transmits different emission control signals including respective control method and emission pattern information to the transmitter 200. In addition, when different direction scenes are implemented in each set even though the same control method is used, the control console device 100 may transmit different emission control signals to the transmitter 200.

Furthermore, the control console device 100 may transmit the at least one emission control signal. That is, the control console device 100 may transmit the emission control signal, which includes identification information of a transmitter transmitting the corresponding emission control signal. Accordingly, the processor 340 may compare identification information of a transmitter stored in the memory 320 with identification information of the transmitter included in the received emission control signal. When the identification information of the transmitter stored in the memory 320 is the same as the identification information of the transmitter included in the received emission control signal, the processor 340 may control the light emitting unit 330 to emit light depending on emission-related data included in the received emission control signal. In this case, identification information of the transmitter 200 may be included in the emission control signal by the control console device 100. When the transmitter 200 transmits the identification information of the transmitter 200 to the light emitting device 300, the identification information of the transmitter 200 may be included in the emission control signal by the transmitter 200.

The light emitting device 300 may receive an emission control signal from the transmitter 200 having identification information corresponding to pre-stored identification information of a transmitter.

As described above, the transmitter 200 may have directivity. The performance planner may place the transmitter 200 in consideration of the specification of a transmitter used in the corresponding performance at a step of planning a performance. However, due to the physical and technical limitations of the transmitter 200, light emitting devices located in some seats may receive all emission control signals transmitted from different transmitters. In more detail, because the light emitting devices located in some of the seats may redundantly receive different emission control signals from two or more transmitters, it may be difficult for a light emitting device to determine an emission control signal for emitting light. Accordingly, according to embodiments of the inventive concept, a light emitting device may correctly determine an emission control signal corresponding to the light emitting device within a limited wireless bandwidth. Moreover, the control console device 100 transmits an emission control signal to the transmitter 200, thereby lowering the effect on noise. Accordingly, it is possible to obtain a performance directing effect different from that of the existing performance.

According to an embodiment of the inventive concept, the transmitter 200 may repeatedly transmit an emission control signal to the light emitting device 300 as much as the predetermined number of times. In general, a signal that the transmitter 200 transmits (broadcasts) is mostly one-time. However, a lot of signals having different bandwidths are present in a performance hall. Accordingly, a signal other than the emission control signal may become noise during performance direction. The noise may prevent the emission control signal from being transmitted correctly to the light emitting device 300. Accordingly, the transmitter 200 transmits an emission control signal to the light emitting device 300 as much as the predetermined number of times (e.g., 5 times per one emission control signal) such that the light emitting device 300 properly receives the emission control signal.

In this case, the light emitting device 300 may receive the same emission control signal multiple times to perform a redundant light emitting operation. To prevent the redundant light emitting operation, each emission control signal may include a Frame Sequence Number (FSN). The FSN may serve to inform the light emitting device 300 of the order of transmitted data (in detail, a data packet indicating an emission pattern). For example, whenever a direction scene is changed, the FSN may have a value that increases by 1. When the light emitting device receives an emission control signal having the same FSN as the previously received emission control signal, the corresponding light emitting device may ignore the corresponding emission control signal by determining that the corresponding emission control signal is the already received emission control signal.

According to an embodiment of the inventive concept, each of the transmitters 200 may use a different wireless frequency bandwidth (channel). In this way, emission control signals transmitted from each of the transmitters 200 may have different wireless bandwidths. The processor 340 may compare identification information of a transmitter stored in the memory 320 with identification information of the transmitter included in the received emission control signal every preset time unit (e.g., a minute or a hour) or whenever an event (e.g., when the next song is played or an audience leaves a seat and comes back) occurs. When the identification information of the transmitter stored in the memory 320 is the same as the identification information of the transmitter included in the received emission control signal, the processor 340 may receive only the emission control signal received through the wireless bandwidth of a signal transmitted by the corresponding transmitter.

According to an embodiment of the inventive concept, the memory 320 may store identification information of the transmitter 200 and wireless bandwidth to be used by the transmitter 200 in a list. In detail, the light emitting device 300 may store the identification information of the transmitter 200 and the wireless bandwidth to be used by the transmitter 200 in the memory 320 in a format of a list in the same way. When an emission control signal including identification information matching the identification information of the transmitter stored in the memory 320 is not received, or when the received emission control signal is not at an appropriate wireless signal level, the light emitting device 300 needs to scan the entire wireless bandwidth (channel) to receive the emission control signal. In detail, when the emission control signal received through a specific wireless bandwidth does not include the identification information of the transmitter stored in the memory 320, the processor 340 needs to search for a wireless bandwidth, through which the emission control signal including the identification information of the transmitter stored in the memory 320 is transmitted, by scanning the entire wireless bandwidth (channels). Accordingly, the processor 340 may storing the list including the identification information of the transmitter to be received by the light emitting device 300 and the wireless bandwidth of a signal transmitted by the transmitter and then may partially (selectively) scan a channel with reference to the list. In this way, the processor 340 may quickly determine the wireless bandwidth to be received.

According to an embodiment of the inventive concept, the control console device 100 needs to control the light emitting device 300 by using the same emission control signal depending on situations in a performance hall. For example, when not correctly receiving control-related information at a step of checking a ticket, a significant number of the light emitting device 300 may cause the light emitting device 300 to fail to emit light depending on the intent of the performance planner even though transmitting different emission control signals to the transmitters 200. Alternatively, for a small performance hall, the transmitters 200 may not need to transmit different emission control signals. In this case, the performance planner needs to control the light emitting device 300 through the control console device 100 based on the same emission control signal.

Accordingly, as the control console device 100 transmits a general-purpose emission control signal to the light emitting device 300 through the transmitter 200, the light emitting device 300 may perform an emission-related operation in all received emission control signals. The light emitting device 300 receiving the general-purpose emission control signal may perform the emission-related operation in all received emission control signals regardless of the identification value of a transmitter stored in the memory 320 in advance. Here, the general-purpose emission control signal may be information that is equally transmitted to all the transmitters 200.

Moreover, the general-purpose emission control signal may be transmitted by the transmitter 200 or may be transmitted by a transmitter (e.g., a transmitter having identification information of '0') separate from the transmitter 200. At this time, when the general-purpose emission control signal is transmitted from the separate transmitter, the general-purpose emission control signal may include identification information of a transmitter, which has not been previously set in the corresponding performance, such as '0'. According to an embodiment, the identification information of the transmitter that has not been set in advance may be identification information that is not stored in a format of a list in the memory 320.

Besides, as performance identification information, which has a specific value, among performance identification information to be described later is included in the emission control signal, the light emitting device 300 may determine that the received emission control signal is a general-purpose emission control signal. In an embodiment, the general-purpose emission control signal may include performance identification information having a value of '0'. Accordingly, as the light emitting device 300 receives an emission control signal including performance identification information having a value of '0', the light emitting device 300 may determine that the corresponding emission control signal is a general-purpose emission control signal.

According to an embodiment of the inventive concept, the control console device 100 may generate and transmit a correction command signal for correcting the identification information of the transmitter stored in the light emitting device 300. When correct control-related information is not entered into the light emitting device included in some sets among the set 400 at a step of checking a ticket, the light emitting device may not emit light depending on the intent of the performance planner. For example, the identification information of a transmitter that is not used in the corresponding performance may be entered into the light emitting device included in some sets, or the identification information of a transmitter that is in charge of another set other than the transmitter in charge of the light emitting device may be entered.

In this case, the control console device 100 may correct the identification information of the transmitter thus wrongly stored, by generating and transmitting a correction command signal for correcting the identification information of the transmitter stored in the light emitting device 300. Furthermore, the correction command signal may include identification information of a specific receiver. Here, identification information of a specific receiver may be identification information of a transmitter that needs to be stored in the corresponding light emitting device at a step of checking a ticket depending on the intent of the performance planner.

Accordingly, to identify an emission control signal of the specific transmitter, the light emitting device receiving the correction command signal may perform an operation of replacing the identification information of the transmitter currently stored in the memory with the identification information of the specific transmitter.

Moreover, similarly to the general-purpose emission control signal, the correction command signal may be transmitted by the transmitter 200 or may be transmitted by a transmitter (e.g., a transmitter having identification information of '0') separate from the transmitter 200. At this time, when the correction command signal is transmitted from the separate transmitter, the correction command signal may include identification information of a transmitter, which has not been previously set in the corresponding performance, such as '0'. According to an embodiment, the identification information of the transmitter that has not been set in advance may be identification information that is not stored in a format of a list in the memory 320.

According to an embodiment of the inventive concept, the control console device 100 may generate and transmit an emission control signal including identification information of the light emitting device 300. According to an embodiment of the inventive concept, the identification information of the light emitting device 300 may be artist identification information associated with a specific artist (a singer or an idol group). Generally, when a plurality of artists perform together like a joint performance by using different cheering sticks produced for each artist, audiences entering a performance hall may cheer different artists. Accordingly, when a plurality of artists performs sequentially, the performance planner needs to control only the light emitting device possessed by an audience cheering the corresponding artist.

In this case, the performance planner may generate an emission control signal including identification information of the light emitting device associated with the currently performing artist through the control console device 100 and then may allow the control console device 100 to transmit the emission control signal to the light emitting device 300. The light emitting device 300 may compare the identification information of the light emitting device included in the emission control signal with the identification information of the light emitting device 300 stored in the memory 320. When the identification information of the light emitting device included in the emission control signal is the same as the identification information of the light emitting device 300 stored in the memory 320, the light emitting device 300 may emit light to correspond to an emission pattern included in the corresponding emission control signal. The identification information of the light emitting device related to the currently performing artist may be mapped with the direction scene in a form of performance direction data and stored in the control console device 100, or may be transmitted after being included in the emission control signal by the performance planner during a performance.

Also, when a plurality of artists perform simultaneously (e.g., appearing on stage all at once like a duet), not sequentially, the control console device 100 may include identification information of all the light emitting devices associated with the artists thus simultaneously performing in the emission control signal and may transmit the identification information of all the light emitting devices.

At a step of producing the light emitting device 300, a step of checking a ticket, or before performance start, identification information of the light emitting device 300 may be stored in the memory 320 through an application of a terminal possessed by an audience. Alternatively, after the audience purchases a light emitting device, the identification information of the light emitting device 300 may be provided to the purchased light emitting device, from an external server over a network or through an application in the audience's terminal and then may be stored in the memory 320.

According to an embodiment of the inventive concept, the control console device 100 may further include an operator and an operation coefficient for the identification information of the light emitting device 300 and may transmit the identification information of the light emitting device 300. The operator may be a logical operator such as 'AND', 'OR', 'XOR' or an arithmetic operator such as '+', or Accordingly, the processor 340 of the light emitting device 300 receiving the operator and operation coefficients may determine whether the identification information of the light emitting device 300 stored in the memory 320 is included in a control target, through calculation (computation). At this time, the reference identification information that is the basis of calculation is stored in advance in a memory (not shown) of the transmitter 200, and may be transmitted after being included in the emission control signal. According to an embodiment, the reference identification information may be included in the emission control by the control console device 100, master device or the transmitter 200 and then may be transmitted through the transmitter 200.

For example, when identification information of a light emitting device associated with artist A is 0xE86 and 0xE87, and identification information of a light emitting device associated with artist B is 0xE88, a light emitting device having any one of 0xE86, 0xE87, and 0xE88 identification information may be controlled as the transmitter 200 includes the reference identification information of '0xE86', an operator of '+', and an operation coefficient of '2' in the emission control signal and transmits the emission control signal. The processor of the light emitting device having identification information of 0xE87 may execute calculations based on the received operator and operation coefficient. A light emitting device having identification information of 0xE86, 0xE87, and 0xE88 may be an emission target. The processor may determine that a light emitting device with identification information of 0xE87 is also an emission target. Accordingly, the corresponding light emitting device may emit light to correspond to an emission pattern included in the emission control signal. In this way, even for light emitting devices associated with different artists and/or light emitting devices associated with the same artist, the performance planner may efficiently control light emitting devices having different versions within a limited wireless bandwidth.

Besides, for a joint performance in which several artists perform together, light emitting devices having different identification information may be present in a performance hall. The light emitting devices carried by audiences cheering different artists may be located in the same set, and the performance planner may need to control only the light emitting devices associated with artists thus currently performing. In this case, together with a reference identification information changing command for changing the reference identification information, the control console device 100 may transmit an emission control signal including an operator and an operation coefficient to the transmitter 200. For example, when identification information of a light emitting device associated with artist A is 0xE86, identification information of a light emitting device associated with artist B is 0xE87, identification information of a light emitting device associated with artist C is 0xE88, and reference identification information currently stored in a memory (not shown) of the transmitter 200 is 0xE86, the control console device 100 may transmit an emission control signal including a command for changing an operator of '+' and an operation coefficient of '2' and the reference identification information. The light emitting device 300 receiving the emission control signal may determine that the reference identification information that is the basis of computation (calculation) is 0xE88, through calculation according to the received operator and operation coefficient. However, the control console device 100 may transmit the changed reference identification information (e.g., 0xE88).

According to an embodiment of the inventive concept, the control console device 100 may transmit a reference identification information changing command, and a master device may generate information about an operator and an operation coefficient and may transmit the information to the transmitter 200.

At a step of producing the light emitting device 300, a step of checking a ticket, or before performance start, the reference identification information may be stored in the memory 320 through an application of a terminal possessed by an audience. Alternatively, after the audience purchases a light emitting device, the reference identification information may be provided to the purchased light emitting device, from an external server over a network or through an application in the audience's terminal and then may be stored in the memory 320.

Moreover, according to an embodiment of the inventive concept, the light emitting device 300 may determine whether to emit light or an emission degree, by determining whether a predetermined condition is satisfied, based on an operator and an operation coefficient. In this regard, the light emitting device 300 may receive operation summary information associated with a condition of an emission operation and may determine whether to emit light or an emission degree, depending on a predetermined condition stored in the memory 320. Here, the operation summary information may be a series of data that allows the light emitting device 300 to determine whether a predetermined condition is satisfied.

For example, the predetermined condition stored in the memory 320 may be as shown in Table 3 below.

TABLE 3

| | Emission operation | Emission operation when emission condition is not satisfied | Operator | Operation coefficient |
|---|---|---|---|---|
| First value | Emitting light when first value is included | Emitting light with pre-stored emission pattern | No calculation | 1 |
| Second value | Emitting light when second value is not included | Not emitting light | Addition | 2 |
| Third value | Emitting light when third value is included + emitting light with 50% brightness when third value is not included, as compared with brightness of light when third value is included | | Subtraction | 3 |
| Fourth value | Emitting light when fourth value is not included + emitting light with 50% brightness when fourth value is included, as compared with brightness of light when fourth value is not included | | Addition and subtraction | 4 |

According to an embodiment of the inventive concept, the control console device 100 may generate a value of a specific range corresponding to the operation summary information. A master device (not shown) may identify information matching the value of the specific range among the operation summary information, may include the identified operation summary information in the emission control signal, and may transmit the emission control signal to the transmitter 200. For example, when one of values of 0 to 127 is generated by the control console device 100 and delivered to the master device, the master device may identify that the delivered value is a first value, may include the operation summary information corresponding to the first value in the emission control signal, and may deliver the emission control signal to the transmitter 200.

According to an embodiment, the master device may be omitted. The transmitter 200 may directly identify the operation summary information, may include the operation summary information in the emission control signal, and may transmit the emission control signal to the light emitting device 300.

An embodiment of Table 3 is only an example. For example, the master device may transmit the operation summary information associated with various conditions by changing the size of data. Referring to Table 3, the operation summary information may include an emission operation (2 bit), an emission operation (1 bit) when an emission condition is not satisfied, an operator (2 bit), and an operation coefficient (2 bit). That is, the operation summary information may have a total size of 7 bits. However, as data allocated to the operation summary information increases, the operation summary information associated with various conditions may be generated and transmitted. On the other hand, as the data allocated to the operation summary information decreases, the number of predetermined conditions may be reduced.

Referring to Table 3, when a specific light emitting device receives an emission control signal including the operation summary information that is a first value, a specific light emitting device may compare identification information of a light emitting device included in the emission control signal with identification information of a specific light emitting device stored in a memory. When the identification information of the light emitting device included in the emission control signal is the same as the identification information of the specific light emitting device stored in the memory, the specific light emitting device may emit light to correspond to the emission pattern included in the corresponding emission control signal. On the other hand, when the identification information of the light emitting device included in the emission control signal is not the same as the identification information of the specific light emitting device stored in the memory, the specific light emitting device may emit light with an emission pattern stored in the memory in advance. At this time, at a step of checking a ticket or before performance start, the emission pattern thus stored in advance may be stored in the memory through an application of a terminal held by an audience.

Similarly to an embodiment of the first value, in the case where the specific light emitting device receives an emission control signal including operation summary information of the second value, an operator of '+', and an operation coefficient of '2', when a result of the calculation indicates that identification information of a specific light emitting device is not included in identification information of some light emitting devices, the specific light emitting device may emit light to correspond to the emission pattern included in the corresponding emission control signal. For example, when identification information of a specific light emitting device is 0xE89 and reference identification information included in an emission control signal is 0xE86, pieces of identification information of light emitting devices included in some light emitting devices are 0xE86, 0xE87, and 0xE88 as a result of the calculation. Accordingly, because identification information of a specific light emitting device is not included in 0xE86, 0xE87, and 0xE88 (that is, because a condition is satisfied), the specific light emitting device may emit light to correspond to an emission pattern included in the corresponding emission control signal.

Moreover, similarly to an embodiment of the second value, in the case where the specific light emitting device receives an emission control signal including operation summary information of the third value, an operator of and an operation coefficient of '3', when a result of the calculation indicates that identification information of a specific light emitting device is included in identification information of some light emitting devices, the specific light emitting device may emit light to correspond to the emission pattern included in the corresponding emission control signal. For example, when the identification information of the light emitting device stored in the memory of the specific light emitting device is 0xE89 and reference identification information included in an emission control signal is 0xE86, pieces of identification information of light emitting devices included in some light emitting devices are 0xE86, 0xE87, 0xE88, and 0xE89 as a result of the calculation. Accordingly, because identification information of a specific light emitting device is included in 0xE86, 0xE87, 0xE88, and 0xE89 (that is, because a condition is satisfied), the specific light emitting device may emit light to correspond to an emission pattern included in the corresponding emission control signal. Moreover, when the identification information of a specific light emitting device is not included in the identification information of some light emitting devices, the specific light emitting device may emit light with 50% brightness as compared to the brightness of the emission pattern included in the corresponding emission control signal.

According to an embodiment of the inventive concept, the operation summary information may be transmitted after being included in a portion of an operator and an operation coefficient described in FIG. 5 below.

According to an embodiment of the inventive concept, the control console device 100 may transmit an emission control signal including performance identification information. In an embodiment of the inventive concept, the performance identification information may refer to information about the performance provided in the corresponding performance hall on the day. For example, the performance identification information is a value of a natural number such as '0', '1', or '2', and may be different or the same for each performance.

In addition, the performance identification information may include at least one of information about an artist's agency, a performance organizer, a performance date, and a performance round. Here, the performance round may mean the actual number of times of the corresponding performance or the number of times of the performance, at which the light emitting device 300 is controlled. According to an embodiment, when the corresponding performance is the tenth performance and the ninth performance at which the light emitting device 300 is controlled, the performance round may be 9. When an artist demonstrates a performance over several days, a significant number of audiences may watch multiple performances to cheer the artist. In this case, because most audiences don't watch a performance at the same seat every time, when the control console device 100 transmits a specific emission control signal for each direction scene the same as the previous performance without information for identifying a performance, such as a performance date or a performance round, directing effects intended by the performance planner may not be expressed.

Besides, when a performance is being demonstrated at another performance hall located around the corresponding performance hall, and a control signal is transmitted and received in another performance hall based on the same protocol as the performance hall, some light emitting devices may also respond to an emission control signal transmitted from another performance hall. This is not an effect intended by the performance planner.

Accordingly, the control console device 100 may transmit an emission control signal including performance identification information of the corresponding performance. The processor 340 may compare performance identification information stored in the memory 320 with performance identification information thus received. When the stored performance identification information is the same as the received performance identification information, the processor 340 may control the light emitting unit 330 to emit light depending on emission-related data included in the received emission control signal. In this case, at a step of checking a ticket or before performance start, the performance identification information may be stored in the memory 320 through an application of a terminal possessed by an audience.

In addition, according to an embodiment of the inventive concept, when the master device, not the control console device 100, may generate the above-mentioned correction command signal, a change command signal of an access code, and a change command signal of a wireless bandwidth (channel) and may transmit the generated signals to the transmitter 200.

To receive an emission control signal including identification information of a transmitter stored in the memory 320, the light emitting device 300 receiving the change command signal of the wireless bandwidth (channel) needs to perform a scanning operation on a wireless bandwidth (channel) again.

Moreover, the master device may generate a change command signal of reference identification information and may transmit the change command signal of reference identification information to the transmitter 200. In an embodiment of the inventive concept, when the master device transmits the change command signal of reference identification information, the transmitter 200 may store reference identification information obtained by changing the reference identification information stored in a memory (not shown) of the transmitter.

FIG. 5 is an example illustrating an emission control signal, according to an embodiment of the inventive concept.

On the basis of performance direction data, the control console device 100 may generate an emission control signal corresponding to a direction scene of each scene in the corresponding performance direction section and may transmit the generated control signal to the transmitter 200.

Referring to FIG. 5, the control console device 100 may transmit the generated emission control signal through a data packet identified in units of packets. In an embodiment, a data packet may include an access code, a header, and a payload. At this time, as shown in FIG. 5, the control console device 100 may include at least one of the above-described FSN, reference identification information, an operator and an operation coefficient, performance identification information, and identification information of the transmitter 200, and an emission pattern in a portion of a payload 510 and may transmit an emission control signal. Also, the identification information of the transmitter 200 and the emission pattern information among the information included in the payload 510 may be essential information. Also, the control console device 100 may include a vibration value of the light emitting device 300 in the payload 510.

According to an embodiment of the inventive concept, the emission pattern of the payload 510 may include a control method of the light emitting device 300 and related information for controlling the light emitting device 300 in a control method. For example, when the control method is group control, the emission pattern of the payload 510 may include information indicating that the current control method is group control, and a current direction scene.

Figure 6:
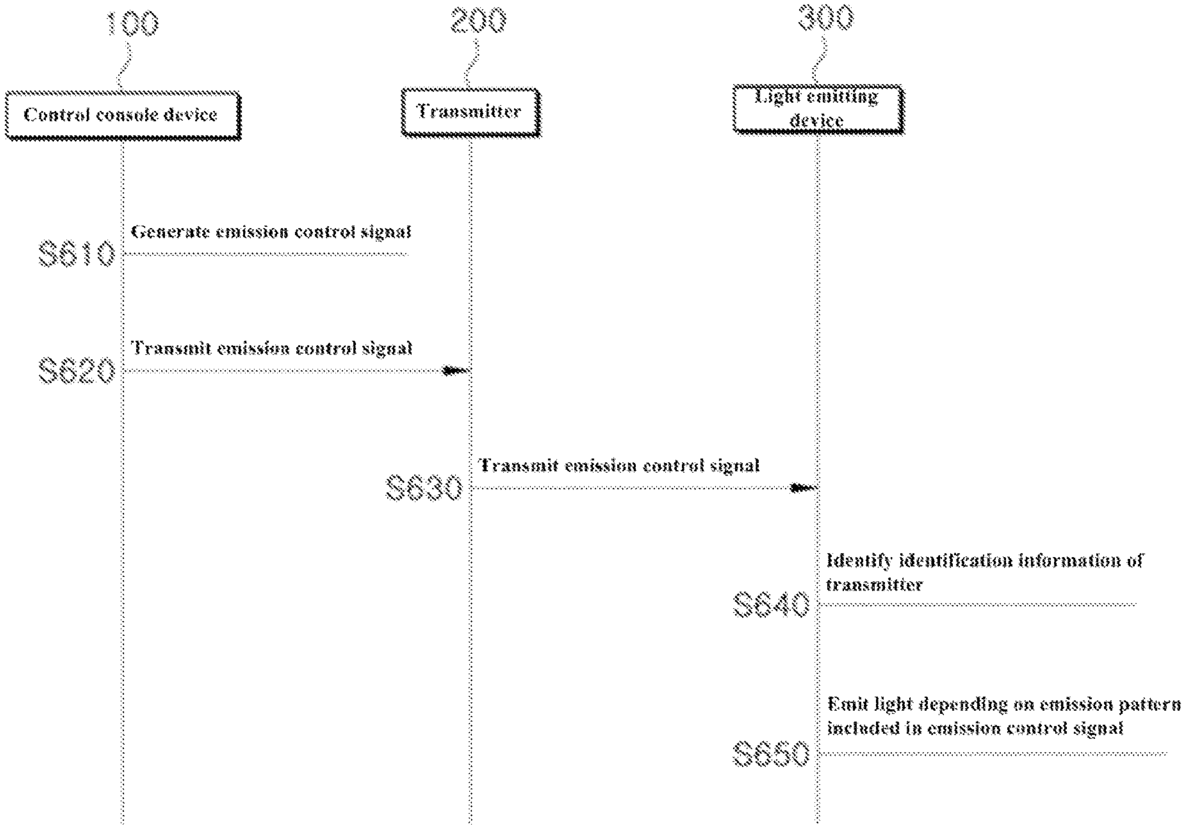
FIG. 6 is a flowchart illustrating a performance direction process, according to an embodiment of the inventive concept.

FIG. 6 is a flowchart illustrating a performance direction process, according to an embodiment of the inventive concept.

Each step of a performance directing method according to an embodiment of the inventive concept may be performed by a performance directing system including the control console device 100, the transmitter 200, and the light emitting device 300.

Hereinafter, it will be described in detail that the performance directing method by the control console device 100, the transmitter 200, and the light emitting device 300, with reference to FIG. 6.

Embodiments described for the control console device 100, the transmitter 200 and the light emitting device 300 are applicable to at least some or all of the performance directing method. On the other hand, embodiments described for the performance directing method are applicable to at least some or all of the embodiments for the control console device 100, the transmitter 200, and the light emitting device 300. Moreover, a performance directing method according to the disclosed embodiments is performed by the control console device 100, the transmitter 200, and the light emitting device 300 disclosed herein, and the embodiment is not limited thereto. For example, the performance directing method may be performed by various types of electronic devices.

First of all, the control console device 100 may generate an emission control signal for each direction scene based on the stored performance direction data [S610].

At a step of planning a performance, the performance direction data may be generated by a data generation device or an external server and may be provided and stored to the control console device 100. Alternatively, the control console device 100 may receive the performance direction data in real time during a performance and may generate the emission control signal corresponding to the performance direction data.

Next, the control console device 100 may transmit an emission control signal to the transmitter 200 [S620].

The control console device 100 may transmit an emission control signal to be transmitted by each transmitter to the transmitter 200. At this time, the emission control signal transmitted to each transmitter may be identical or different for each transmitter.

Next, the transmitter 200 may transmit the emission control signal to the light emitting device 300 [S630].

Next, the light emitting device 300 may receive the emission control signal from the transmitter 200 and may compare identification information of the transmitter 200 included in the emission control signal with identification information of a transmitter stored in the memory 320. Accordingly, the light emitting device 300 may identify the identification information of the transmitter [S640].

The transmitter 200 may have directivity. A performance planner may place the transmitter 200 in consideration of the specification of a transmitter used in the corresponding performance at a step of planning a performance. Accordingly, the light emitting device 300 may receive an emission control signal from the transmitter 200 having identification information corresponding to pre-stored identification information of a transmitter.

Finally, the light emitting device 300 may compare identification information of a transmitter stored in the memory 320 with identification information of the transmitter 200 included in the received emission control signal. When the identification information of the transmitter stored in the memory 320 is the same as the identification information of the transmitter 200, the light emitting device 300 may emit light depending on an emission pattern included in the received emission control signal [S650].

Various embodiments according to an embodiment of the inventive concept may be implemented as software including one or more instructions stored in a storage medium (e.g., a memory) readable by a machine. For example, a processor (e.g., the processor 130 or 340) of the machine may call at least one instruction among the stored one or more instructions from a storage medium and then may execute the at least one instruction. This enables the machine to operate to perform at least one function depending on the called at least one instruction. The one or more instructions may include a code generated by a complier or a code executable by an interpreter. The machine-readable storage medium may be provided in the form of a non-transitory storage medium. Herein, 'non-transitory' just means that the storage medium is a tangible device and does not include a signal (e.g., electromagnetic waves), and this term does not distinguish between the case where data is semipermanently stored in the storage medium and the case where the data is stored temporarily. For example, the 'non-transitory storage medium' may include a buffer in which data is temporarily stored.

According to an embodiment, a method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store (e.g., PlayStore™), directly between two user devices (e.g., smartphones), or online. In the case of on-line distribution, at least part of the computer program product (e.g., a downloadable app) may be at least temporarily stored in the machine-readable storage medium such as the memory of a manufacturer's server, an application store's server, or a relay server or may be generated temporarily. Although an embodiment of the inventive concept are described with reference to the accompanying drawings, it will be understood by those skilled in the art to which the inventive concept pertains that the inventive concept may be carried out in other detailed forms without changing the scope and spirit or the essential features of the inventive concept. Therefore, the embodiments described above are provided by way of example in all aspects, and should be construed not to be restrictive.

According to an embodiment of the inventive concept, a frequency band may be used more efficiently, and a delay time of a control signal may be reduced as compared to individual control of the light emitting device during the performance direction in a performance hall Besides, as compared with a conventional technology, it is possible to simultaneously control a lot of light emitting devices in real time.

According to an embodiment of the inventive concept, because it is possible to direct a performance during the performance direction in the performance hall while a light emitting state of a light emitting device is changed in real time, various directing scenes and light emitting effects may be easily provided depending on situations.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A performance directing system comprising:

a control console device configured to generate at least one emission control signal including data, in which an emission-related operation is defined for a respective direction scene of direction scenes, and to transmit the at least one emission control signal to at least one communication device;

the at least one communication device configured to transmit the at least one emission control signal received from the control console device; and at least one light emitting device configured to identify a particular emission control signal, which includes predetermined identification information of a communication device, from among emission control signals thus transmitted and to perform the emission-related operation defined in the data in the identified particular emission control signal, wherein, when an identification information correction command signal including specific identification information of a specific communication device is received, the at least one light emitting device replaces the predetermined identification information of the communication device with the specific identification information of the specific communication device to identify the particular emission control signal of the specific communication device.

2. The performance directing system of claim 1, wherein a first emission control signal of the emission control signals is transmitted through a first wireless bandwidth, and a second emission control signal of the emission control signals is transmitted through a second wireless bandwidth, which is different from the first wireless bandwidth.

3. The performance directing system of claim 1, wherein the at least one light emitting device stores specific identification information of the at least one communication device and a wireless bandwidth to be used by the at least one communication device in a list.

4. The performance directing system of claim 1, wherein, when receiving a general-purpose emission control signal, the at least one light emitting device performs an emission-related operation defined in data in all emission control signals thus received, regardless of the specific identification information of the communication device thus stored in advance.

5. The performance directing system of claim 1, wherein the data further includes the specific identification information of the light emitting device, wherein, only when the specific identification information of the light emitting device included in the data is identical to pre-stored identification information of a light emitting device thus stored in advance, the at least one light emitting device performs the emission-related operation defined in the data in the at least one emission control signal.

6. The performance directing system of claim 5, wherein the data further includes an operator and an operation coefficient, and wherein the at least one light emitting device calculates the specific identification information of a light emitting device, which will perform the emission-related operation, based on the operator and the operation coefficient, and performs the emission-related operation defined in the data in the at least one emission control signal when the calculation result indicates that the pre-stored identification information of the light emitting device is included in the specific identification information of the light emitting device, which will perform the emission-related operation.

7. The performance directing system of claim 5, wherein the data further includes performance identification information, and wherein the performance identification information includes at least one of an agency, a performance organizer, a performance date, and a performance round.

8. A performance directing method in a performance hall by using a light emitting device, the method comprising:

generating, by a control console device, at least one emission control signal including data, in which an emission-related operation is defined for a respective direction scene of direction scenes, and transmitting the at least one emission control signal to at least one communication device;

transmitting, by the at least one communication device, the at least one emission control signal received from the control console device; and identifying, by at least one light emitting device, a particular emission control signal, which includes predetermined identification information of a communication device, from among emission control signals thus transmitted and performing the emission-related operation defined in the data in the identified particular emission control signal, wherein, when an identification information correction command signal including specific identification information of a specific communication device is received, the at least one light emitting device replaces the predetermined identification information of the communication device with the specific identification information of the specific communication device to identify the particular emission control signal of the specific communication device.

9. The method of claim 8, wherein a first emission control signal of the emission control signals is transmitted through a first wireless bandwidth, and a second emission control signal of the emission control signals is transmitted through a second wireless bandwidth, which is different from the first wireless bandwidth.

10. The method of claim 8, wherein the at least one light emitting device stores the specific identification information of the at least one communication device and a wireless bandwidth to be used by the at least one communication device in a list.

11. The method of claim 8, wherein, when receiving a general-purpose emission control signal, the at least one light emitting device performs an emission-related operation defined in data in all emission control signals thus received, regardless of the specific identification information of the communication device thus stored in advance.

12. The method of claim 8, wherein the data further includes the specific identification information of the light emitting device, wherein, only when the specific identification information of the light emitting device included in the data is identical to pre-stored identification information of a light emitting device thus stored in advance, the at least one light emitting device performs the emission-related operation defined in the data in the at least one emission control signal.

13. The method of claim 12, wherein the data further includes an operator and an operation coefficient, and wherein the at least one light emitting device calculates the specific identification information of a light emitting device, which will perform the emission-related operation, based on the operator and the operation coefficient, and performs the emission-related operation defined in the data in the at least one emission control signal when the calculation result indicates that the pre-stored identification information of the light emitting device is included in the specific identification information of the light emitting device, which will perform the emission-related operation.

14. The method of claim 12, wherein the data further includes performance identification information, and wherein the performance identification information includes at least one of an agency, a performance organizer, a performance date, and a performance round.

15. A light emitting device for performance direction comprising:

a communication unit configured to receive at least one emission control signal transmitted from a control console device through at least one communication device;

a light emitting unit configured to emit light by using a light source element; and a memory configured to store data; and a processor configured to control an operation of the light emitting device, wherein the processor is configured to:

identify a particular emission control signal, which includes predetermined identification information of a communication device, from among emission control signals thus transmitted; and perform an emission-related operation defined in data in the identified particular emission control signal, wherein the processor is further configured to, when an identification information correction command signal including specific identification information of a specific communication device is received, replace the predetermined identification information of the communication device with the specific identification information of the specific communication device to identify the particular emission control signal of the specific communication device.

* * * * *